Feb. 24, 1970 W. WÖLTCHE 3,497,291
WIDE-ANGLE PHOTOGRAPHIC OR CINEMATOGRAPHIC OBJECTIVE
Filed Feb. 20, 1967
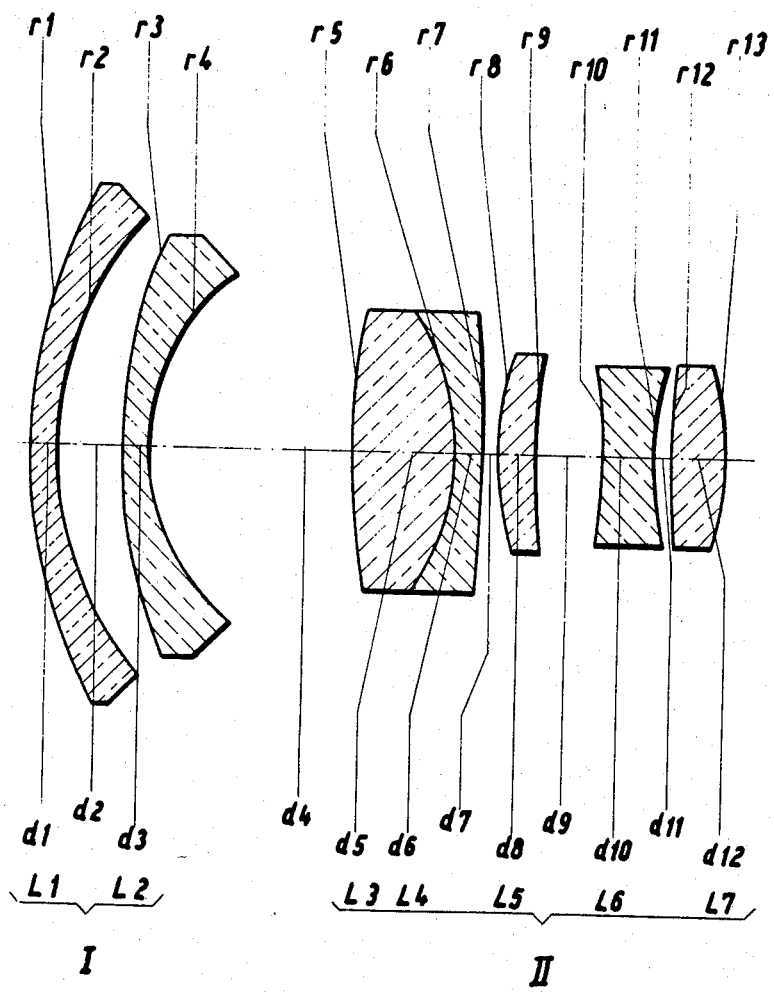
Inventor:
WALTER WÖLTCHE
Karl F. Ross
Attorney 3,497,291
WIDE-ANGLE PHOTOGRAPHIC OR
CINEMATOGRAPHIC OBJECTIVE
Walter Wöltche, Bad Kreuznach, Germany, assignor to Jos. Schneider & Co., Bad Kreuznach, Germany, a corporation of Germany
Filed Feb. 20, 1967, Ser. No. 619,115
Claims priority, application Germany, Feb. 26, 1966, Sch 38,567
Int. Cl. G02b 9/62
U.S. Cl. 350—215                1 Claim

ABSTRACT OF THE DISCLOSURE

Optical objective with a dispersive front group consisting of two meniscus-shaped singlets and a rear group composed of four air-spaced members of which the third is a biconcave singlet while the three others are positively refracting, the first of these members being a biconvex doublet with a forwardly concave cemented surface of positive refractivity ranging between substantially 0.18 and 0.35 times the overall refractive power; the axial thickness of this doublet is greater than 20% of the overall focal length while the axial thickness of the biconcave third member of the rear group is greater than 5% and preferably equal to about 10% of this overall focal length. The second meniscus of the front group has a strongly curved concave rear surface with a radius less than 0.5 times the overall focal length.

---

My present invention relates to a photographic or cinematographic objective having a wide angle of view.

The invention is more particularly directed to an objective of the type disclosed in commonly owned U.S. Patent No. 2,824,495 to G. Klemt. This known objective has a dispersive front group composed of two meniscus-shaped singlets with rearwardly facing concavities and a rear group composed of four air-spaced lens members, the third of these lens members being biconcave (and therefore negatively refracting) while the other three lens members are of positive refractivity. The objective has an aperture ratio of 1:4 and an image distance or back-focal length of approximately 1.3 times its overall focal length. Its effective field angle is about 75°.

The general object of my present invention is to provide an improved objective of this type wherein, with substantially the same relative aperture, back-focal length, angle of view and overall dimensions, the residual aberrations and particularly the field curvature are further corrected.

I have found, in accordance with this invention, that the foregoing object may be realized if the positive first member of the rear component is a doublet of axial thickness greater than 20% of the overall focal length, the cemented surface of this doublet being forwardly concave and of positive power ranging between substantially 18% and 35% of the overall refractive power of the system. All the other lens members of the system may be singlets, including the last (fourth) member of the rear group which in the aforementioned Klemt patent has been shown as a doublet.

In order to minimize entrance-pupil aberration and asymmetric aberrations of the sagittal rays, the negatively refracting biconcave third member of the rear group has—pursuant to another feature of my invention—an axial thickness greater than 5% and preferably equal to about 10% of the overall focal length; at the same time, and for the same purpose, the second meniscus of the dispersive front group is given a strongly curved rear surface whose radius of curvature should be less than one-half the overall focal length.

The sole figure of the accompanying drawing shows a representative optical objective embodying the invention.

The objective shown in the drawing consists of a dispersive front group I and a colective rear group II separated by a relatively larger air space $d4$. Front group I is composed of two meniscus-shaped singlets L1 and L2 with rearwardly facing concavities, separated by an air space $d2$; lens L1 has radii $r1$, $r2$ and thickness $d1$, while lens L2 has radii $r3$, $r4$ and thickness $d3$.

Rear component II consists of four air-spaced members of which the first is a doublet constituted by a biconvex lens L3 (radii $r5$, $r6$ and thickness $d5$) cemented onto a meniscus-shaped negative lens L4 (radii $r6$, $r7$ and thickness $d6$). The second member of this group, separated from the doublet L3, L4 by an air space $d7$, is a positively refracting singlet L5 with a convex forward face of radius $r8$ and a concave rear face of radius $r9$, its thickness being designated $d8$. The third group is a biconcave singlet L6 with a shallower front surface of radius $r10$ defining with the rear surface ($r9$) of lens L5 a diaphragm space $d9$; lens L6 has an axial thickness $d10$ and a radius of curvature $r11$ for its more strongly curved rear surface. The fourth member L7, separated from lens L6 by an air space $d11$, is a biconvex singlet with front and rear radii $r12$, $r13$ and thickness $d12$.

The following table lists representative numerical values for the radii $r1$ to $r13$ and the thicknesses and separations $d1$ and $d12$ of lens members L1 to L7, based on an overall focal length $f$ of 100 linear units (e.g. mm.), together with their refractive indices $n_e$ and Abbe numbers $\nu$, given for a spectral wavelength $\lambda=546.1$ m$\mu$, as well as the refractive powers $\Delta n/r$ for each of the lens surfaces in absolute terms, to be compared with an overall power of $1/f=0.01$. This system has an aperture ratio of 1:4, a back-focal length of 129.2 and a field angle of 75°.

TABLE

| | | Radii | Thicknesses and Separations | $n_e$ | $\nu$ | $\Delta n/r$ |
|---|---|---|---|---|---|---|
| I | L1 | $r1=+011.29$ | $d1=4.91$ | 1.51871 | 63.96 | +0.005121 |
| | | $r2=+65.35$ | $d2=12.28$ | | | −0.007936 |
| | L2 | $r3=+100.72$ | $d3=4.91$ | 1.51871 | 63.96 | +0.005150 |
| | | $r4=+41.50$ | $d4=39.29$ | | | −0.012499 |
| II | L3 | $r5=+131.77$ | $d5=19.30$ | 1.62508 | 52.93 | +0.004744 |
| | | $r6=-46.87$ | $d6=5.26$ | 1.50228 | 65.92 | +0.002620 |
| | L4 | $r7=-319.47$ | $d7=3.51$ | | | +0.001572 |
| | L5 | $r8=+64.24$ | $d8=6.31$ | 1.62287 | 60.06 | +0.009696 |
| | | $r9=+137.14$ | $d9=12.28$ | Diaphragm space | | −0.004542 |
| | L6 | $r10=-110.72$ | $d10=10.17$ | 1.70444 | 29.84 | −0.006362 |
| | | $r11=+66.66$ | $d11=2.81$ | | | −0.010568 |
| | L7 | $r12=+175.52$ | $d12=10.53$ | 1.68081 | 55.31 | +0.003879 |
| | | $r13=-56.17$ | | | | +0.012121 |

The numerical values of the foregoing table are to be understood as valid within tolerance limits of substantially ±10% for the radii $r1$ to $r13$, the thicknesses and separations $d1$ to $d12$, the surface powers $\Delta n/r$ and the the Abbe numbers $\nu$, and of substantially ±0.02 for the refractive indices $n_e$.

I claim:

1. An optical objective comprising a dispersive front group, consisting of two air-spaced negatively refractive menisci with rearwardly facing concavities, and a collective rear group consisting of four air-spaced lens members including a positive first member, a positive second member, a biconcave third member and a positive fourth member, said positive first member being a biconvex doublet composed of a positive lens and a negative lens; the numerical values of the radii $r1$ to $r13$ and the thicknesses and separations $d1$ to $d12$ of the first meniscus L1, the second meniscus L2, the positive lens L3 of said first member, the negative lens L4 of said first member, said second member L5, said third member L6 and said fourth member L7, based upon an overall focal length of numerical value 100, their refractive indices $n_e$ and their Abbe numbers $\nu$, for a wavelength $\lambda=546.1$ m$\mu$, being substantially as given in the following table:

| Lens | Radii | Thicknesses and Separations | $n_e$ | $\nu$ |
|---|---|---|---|---|
| L1 | $r1=+101$ | $d1=4.9$ | 1.52 | 64 |
|    | $r2=+65$  | $d2=12.2$ |      |    |
| L2 | $r3=+101$ | $d3=4.9$  | 1.52 | 64 |
|    | $r4=+42$  | $d4=39.3$ |      |    |
| L3 | $r5=+132$ | $d5=19.3$ | 1.63 | 53 |
|    | $r6=-47$  |           |      |    |
| L4 | $r7=-319$ | $d6=5.3$  | 1.50 | 66 |
|    |           | $d7=3.5$  |      |    |
| L5 | $r8=+64$  | $d8=6.3$  | 1.62 | 60 |
|    | $r9=+137$ |           |      |    |
|    |           | $d9=12.3$ | Diaphragm space | |
| L6 | $r10=-111$ | $d10=10.2$ | 1.70 | 30 |
|    | $r11=+67$  | $d11=2.8$  |      |    |
| L7 | $r12=+176$ | $d12=10.5$ | 1.68 | 55 |
|    | $r13=-56$  |            |      |    |

References Cited

UNITED STATES PATENTS 2,824,495    2/1958    Klemt _____ 350—215

FOREIGN PATENTS 931,063    7/1963    Great Britain.

JOHN K. CORBIN, Primary Examiner